United States Patent [19]

Harris et al.

[11] Patent Number: 4,781,803

[45] Date of Patent: Nov. 1, 1988

[54] ELECTROLYTIC PROCESSES EMPLOYING PLATINUM BASED AMORPHOUS METAL ALLOY OXYGEN ANODES

[75] Inventors: Jonathan H. Harris, Shaker Heights; Michael A. Tenhover, Solon; Robert K. Grasselli, Aurora, all of Ohio; Michael D. Ward, Newark, Del.

[73] Assignee: The Standard Oil Company, Cleveland, Ohio

[21] Appl. No.: 874,617

[22] Filed: Jun. 16, 1986

Related U.S. Application Data

[63] Continuation of Ser. No. 705,688, Feb. 26, 1985, abandoned, which is a continuation-in-part of Ser. No. 606,275, May 2, 1984, abandoned.

[51] Int. Cl.$^4$ .............................................. C25B 1/02
[52] U.S. Cl. ................................. 204/129; 204/293; 148/403
[58] Field of Search ............... 204/98, 128, 290 R, 204/293, 129; 148/403

[56] References Cited

U.S. PATENT DOCUMENTS

| | | | |
|---|---|---|---|
| 3,234,110 | 2/1966 | Beer | 204/38 |
| 3,236,756 | 2/1966 | Beer | 204/98 |
| 3,711,385 | 1/1973 | Beer | 204/59 |
| 3,853,739 | 12/1974 | Kolb et al. | 204/290 F |
| 3,856,513 | 12/1974 | Chen et al. | 75/122 |
| 4,036,638 | 7/1977 | Ray et al. | 75/123 B |
| 4,339,270 | 7/1982 | Hashimoto et al. | 148/403 |
| 4,498,962 | 2/1985 | Oda et al. | 204/129 |
| 4,544,473 | 10/1985 | Ovshinsky | 204/292 |
| 4,560,454 | 12/1985 | Harris et al. | 204/293 |

FOREIGN PATENT DOCUMENTS

| | | |
|---|---|---|
| 105453 | 1/1980 | Japan . |
| 105454 | 1/1980 | Japan . |
| 150148 | 4/1980 | Japan . |
| 107439 | 12/1981 | Japan . |
| 2023177 | 5/1979 | United Kingdom . |
| 2146660 | 11/1985 | United Kingdom . |

OTHER PUBLICATIONS

"The Anodic Polarization Behavior of Amorphous Pd–Ti–P Alloys in NaCl Solutions" *Electrochimica Acta*, 25, pp. 1215–1220 (1980).

"Anodic Characteristics of Amorphous Ternary Palladium–Phosphorus Alloys Containing Ruthenium, Rhodium, Iridium or Platinum in a Hot Concentrated Sodium Chloride Solution" *Journal of Applied Electrochemistry*, 13, pp. 295–306 (1983).

"Anodic Characteristics of Amorphous Palladium–Iridium–Phosphorus Alloys in a Hot Concentrated Sodium Chloride Solution" *Journal of Non-Crystalline Solids*, 54, pp. 85–100 (1983).

*Primary Examiner*—John F. Niebling
*Assistant Examiner*—Steven P. Marquis
*Attorney, Agent, or Firm*—Joseph G. Curatolo; Larry W. Evans

[57] ABSTRACT

Improved electrolytic processes employing oxygen anodes. The improvement comprises the step of conducting a electrolysis process in an electrolytic cell having a platinum based amorphous metal alloy oxygen anode having the formula $$Pt_p A_a D_d$$

where
A is Cr, Mo, W, Fe, Os, Ir, Cu, Ni, Rh, Pd, Ag, Ti, Ru, Nb, V, Ta, Au and mixtures thereof;
D is B, C, Si, Al, Ge, P, As, Sb, Sn and mixtures thereof;
p ranges from about 40 to 92;
a ranges from about 0 to 40; and
d ranges from about 8 to 60, with the proviso that $p+a+d=100$.

27 Claims, No Drawings

ELECTROLYTIC PROCESSES EMPLOYING PLATINUM BASED AMORPHOUS METAL ALLOY OXYGEN ANODES

CROSS-REFERENCE TO RELATED APPLICATION

This application is a continuation of application Ser. No. 705,688, filed Feb. 26, 1985, now abandoned, which is a continuation-in-part of Ser. No. 606,275, filed May 2, 1984, which is now abandoned.

TECHNICAL FIELD

The present invention is directed toward the use of amorphous metal anodes which are electrically conductive in electrolytic cells and hence can be used for electrofiltration, oxygen generation and the like. Amorphous metal alloy materials have become of interest in recent years due to their unique combinations of mechanical, chemical and electrical properties which are specially well suited for newly emerging applications. Amorphous metal materials have compositionally variable properties, high hardness and strength, flexibility, soft magnetic and ferroelectronic properties, very high resistance to corrosion and wear, unusual alloy compositions, and high resistance to radiation damage. These characteristics are desirable for applications such as low temperature welding alloys, magnetic bubble memories, high field superconducting devices and soft magnetic materials for power transformer cores.

Given their resistance to corrosion, the amorphous metal alloys disclosed herein are particularly useful as oxygen anodes. Other uses as electrodes include use as an anode in electrowinning of copper and zinc; use in fuel cells; use in waste water treatment and, in organic reactions such as pinacol formation and electrochemical fluorination of organic compounds. These alloys can also be employed as hydrogen permeable membranes.

BACKGROUND ART

The unique combination of properties possessed by amorphous metal alloy materials may be attributed to the disordered atomic structure of amorphous materials which ensures that the material is chemically homogeneous and free from the extended defects that are known to limit the performance of crystalline materials.

Generally, amorphous materials are formed by rapidly cooling the material from a molten state. Such cooling occurs at rates on the order of $10^{6°}$ C./second. Processes that provide such cooling rates include sputtering, vacuum evaporation, plasma spraying and direct quenching from the liquid state. Direct quenching from the liquid state has found the greatest commercial success inasmuch as a variety of alloys are known that can be manufactured by this technique in various forms such as thin films, ribbons and wires.

U.S. Pat. No. 3,856,513 describes novel metal alloy compositions obtained by direct quenching from the melt and includes a general discussion of this process. The patent describes magnetic amorphous metal alloys formed by subjecting the alloy composition to rapid cooling from a temperature above its melting temperature. A stream of the molten metal was directed into the nip of rotating double rolls maintained at room temperature. The quenched metal, obtained in the form of a ribbon, was substantially amorphous as indicated by X-ray diffraction measurements, was ductile, and had a tensile strength of about 350,000 psi (2415 MPa).

U.S. Pat. No. 4,036,638 describes binary amorphous alloys of iron or cobalt and boron. The claimed amorphous alloys were formed by a vacuum melt-casting process wherein molten alloy was ejected through an orifice and against a rotating cylinder in a partial vacuum of about 100 millitorr. Such amorphous alloys were obtained as continuous ribbons and all exhibit high mechanical hardness and ductility.

U.S. Pat. No. 4,264,358 discloses amorphous superconducting glassy alloys comprising one or more Group IVB, VB, VIB, VIIB or VIII transition metals and one or more metalloids such as B, P, C, N, Si, Ge, or Al. The alloys are stated to have utility as high field superconducting magnet materials.

The amorphous metal alloys described hereinabove have not been suggested for usage as electrodes in electrolytic processes in distinction from the alloys utilized for practice of the present invention. With respect to processes for chlorine evolution from sodium chloride solutions, certain palladium-phosphorus based metal alloys have been prepared and described in U.S. Pat. No. 4,339,270 which discloses a variety of ternary amorphous metal alloys consisting of 10 to 40 atomic percent phosphorus and/or silicon and 90 to 60 atomic percent of two or more of palladium, rhenium and platinum. Additional elements that can be present include titanium, zirconium, niobium, tantalum and/or iridium. The alloys can be used as electrodes for electrolysis and the patent reports high corrosion resistance in the electrolysis of halide solutions.

The anodic characteristics of these alloys have been studied by three of the patentees, M. Hara, K. Hashimoto and T. Masumoto and reported in various journals. One such publication entitled "The Anodic Polarization Behavior of Amorphous Pd-Ti-P Alloys in NaCl Solution" *Electrochimica Acta*, 25, pp. 1215–1220 (1980) describes the reaction of palladium chips and phosphorus at elevated temperatures to form palladium phosphide which is then melted with titanium. The resulting alloy was then formed into ribbons 10 to 30 microns in thickness by the rotating wheel method.

"Anodic Characteristics of Amorphous Ternary Palladium-Phosphorus Alloys Containing Ruthenium, Rhodium, Iridium, or Platinum in a Hot Concentrated Sodium Chloride Solution", reported in the *Journal of Applied Electrochemistry* 13, pp. 295–306 (1983) describes the entitled alloys, again prepared by the rotating wheel method from the molten state. Palladium-silicon alloys were also prepared and evaluated but were found to be unsatisfactory as anodes. The reported anode alloys were found to be more corrosion resistant and had a higher chlorine activity and lower oxygen activity than DSA.

Lastly, "Anodic Characteristics of Amorphous Palladium-Iridium-Phosphorus Alloys in a Hot Concentrated Sodium Chloride Solution" reported in *Journal of Non-Crystalline Solids*, 54, pp. 85–100 (1983) describes such alloys also prepared by the rotating wheel method. Again, moderate corrosion resistance, high chlorine activity and low oxygen activity were reported.

The authors found that the electrocatalytic selectivity of these alloys was significantly higher than that of the known dimensionally stable anodes (DSA) consisting of an oxide mixture of ruthenium, and titanium supported by metallic titanium. A disadvantage of DSA is that the electrolysis of sodium chloride is not entirely selective for chlorine and some oxygen is produced. The alloys reported were less active for oxygen evolution than DSA.

Dimensionally stable anodes are described in the following three early U.S. patents. U.S. Pat. No. 3,234,110 calls for an electrode comprising titanium or a titanium alloy core, coated at least partially with titanium oxide which coating is, in turn, provided with a noble metal coating such as platinum, rhodium, iridium and alloys thereof.

U.S. Pat. No. 3,236,756 discloses an electrode comprising a titanium core, a porous coating thereon of platinum and/or rhodium and a layer of titanium oxide on the core at the places where the coating is porous.

U.S. Pat. No. 3,711,385 is directed toward electrodes comprising a core of a film forming metal consisting of titanium, tantalum, zirconium, niobium and tungsten, carrying an outside layer of a metal oxide of at least one platinum metal from the group consisting of platinum, iridium, rhodium, palladium, ruthenium and osmium.

All three of these electrodes have utility in electrolytic processes although unlike the anodes of the present invention, none are amorphous metals. Thus, despite the state of the art in amorphous metal alloys, there has not been a teaching heretofore of the use of platinum based amorphous metal alloys as anodes in processes such as electrofiltration and oxygen evolution. The specific alloys disclosed herein are extremely corrosion resistant and substantially 100 percent selective to chlorine.

SUMMARY OF THE INVENTION

The present invention is directed toward an improved electrolytic process employing oxygen anodes, the improvement comprising the step of conducting the electrolysis process in an electrolytic cell having a platinum based amorphous metal alloy oxygen anode of the formula $$Pt_p A_a D_d$$

where

A is Cr, Mo, W, Fe, Os, Ir, Cu, Ni, Rh, Pd, Ag, Ti, Ru, Nb, V, Ta, Au and mixtures thereof;

D is B, C, Si, Al, Ge, P, As, Sb, Sn and mixtures thereof;

p ranges from about 40 to 92;

a ranges from about 0 to 40; and d ranges from about 8 to 60, with the proviso that $p+a+d=100$.

PREFERRED MODE FOR CARRYING OUT THE INVENTION

Electrolytic processes wherein oxygen anodes are employed include electrofiltration, electrogalvanizing, electrowinning, water treatment, and oxygen generation. It has now been found that by the use of certain amorphous metal alloys as oxygen anodes, the processes can be improved in measures such as corrosion resistance of the anode. The improvement more specifically involves the step of conducting electrolysis in an electrolytic cell having a platinum based amorphous metal alloy oxygen anode of the formula $$Pt_p A_a D_d$$

where

A is Cr, Mo, W, Fe, Os, Ir, Cu, Ni, Rh, Pd, Ag, Ti, Ru, Nb, V, Ta, Au and mixtures thereof;

D is B, C, Si, Al, Ge, P, As, Sb, Sn and mixtures thereof;

p ranges from about 40 to 92;

a ranges from about 0 to 40; and d ranges from about 8 to 60, with the proviso that $p+a+d=100$.

More particularly, the amorphous metal alloy oxygen anodes of the present invention include those where A is Cr, Mo, W, Fe, Os, Cu, Ni, Ag, V, Au and mixtures thereof where D is as related in the general formula hereinabove or, where D is B, Al, Ge, As, Sb, Sn and mixtures thereof and A is as stated in the general formula hereinabove.

The foregoing metal alloys can be binary or ternary with Pt and D being mandatory and A optional. The use of the phrase "amorphous metal alloys" herein refers to amorphous metal-containing alloys that may also comprise one or more of the foregoing non-metallic elements. Amorphous metal alloys may thus include non-metallic elements such as boron, silicon, phosphorus, arsenic, germanium and antimony. Several preferred combinations of elements include Pt/Si; Pt/Ta/Si; Pt/Ge; Pt/Ge/Si; Pt/Ag/Si; Pt/B/Si; Pt/Ir/Si; Pt/Ir/B; Pt/B; Pt/Sb; Pt/Pd/Si and Pt/Ge/Al. The foregoing list is not to be construed as limiting but merely exemplary.

As part of this invention, it has been discovered that differences in the corrosion resistance and electrochemical properties exist between the crystalline and amorphous phases of these alloys when used as oxygen anodes. For example, different overpotential characteristics for oxygen, chlorine and hydrogen evolution, differences in the underpotential electrochemical absorption of hydrogen and corrosion resistance under anodic bias, have all been observed in our work.

These alloys can be prepared by any of the standard techniques for fabricating amorphous metal alloys. Thus, any physical or chemical method, such as electron beam evaporation, chemical and/or physical decomposition, ion-cluster, ion plating, liquid quench or R.F. and D.C. sputtering process can be utilized. The amorphous alloy can be either solid, powder or thin film form, either free standing or attached to a substrate. Trace impurities such as O, N, S, Se, Te and Ar are not expected to be seriously detrimental to the preparation and performance of the materials. The only restriction on the environment in which the materials are prepared or operated is that the temperature during both stages be lower than the crystallization temperature of the amorphous metal alloy.

The amorphous metal alloys disclosed herein are particularly suitable as coatings on substrate metals which are then employed as oxygen anodes in various electrochemical processes. While the commercial interest in a given process may focus on what occurs at the cathode, and the oxygen anode merely balances the reaction, the corrosion resistance and reduced power consumption provides a significant improvement in existing processes with conventional anodes.

Preferred substrate metals for use as the anodes include titanium, niobium, tantalum and zirconium, although other metals and various non-metals are also suitable. The substrate is useful primarily to provide support for the amorphous metal alloys and therefore can also be a non-conductor or semi-conductor material. The coating is readily deposited upon the substrate by sputtering, as was done for the examples presented hereinbelow. Coating thicknesses are not crucial and may range broadly, for example, up to about 100 microns although other thicknesses are not necessarily precluded so long as they are practical for their intended use. A useful thickness, exemplified in the work hereinbelow, is 3000 Å.

As will be appreciated, the desired thickness is somewhat dependent upon the process of preparation of the anode and somewhat upon the intended use. Thus, a free-standing or non-supported anode, as prepared by liquid quenching, may have a thickness of approximately 100 microns. Or an amorphous alloy anode can be prepared by pressing the amorphous alloy, in powder form, into a predetermined shape and can also be thick enough to be free-standing. Where a sputtering process is employed, relatively thin layers can be deposited and these would be preferably supported by a suitable substrate, as noted hereinabove. Thus, it is to be understood that the actual anode employed in the present invention is the amorphous metal alloy whether supported or unsupported. Where a very thin layer is employed, a support may be convenient or even necessary to provide structural integrity.

Irrespective of the use of the amorphous metal alloys, as a coating or a solid product, the alloys are substantially amorphous. The term "substantially" as used herein in reference to the amorphous metal alloy means that the metal alloys are at least fifty percent amorphous. Preferably the metal alloy is at least eighty percent amorphous and most preferably about one hundred percent amorphous, as indicated by X-ray diffraction analysis.

The processes of electrolysis can be conducted at standard conditions known to those skilled in the art. These include, voltages in the range of from about 1.10 to 2.50 volts (SCE) and current densities of from about 10 to 2000 mA/cm$^2$. Electrolyte solutions (aqueous) are generally at a pH of 1 to 12 and molar concentrations of from about 0.25 to 4M. Temperature can range between about 0° to 100° C. with a range of 20° to 70° C. being preferred. The cell configuration is not crucial to practice of the process and therefore is not a limitation of the present invention.

In the examples which follow, nine platinum based amorphous metal alloys were prepared via radio frequency sputtering in argon gas. A 2" Research S-Gun, manufactured by Sputtered Films, Inc. was employed. As is known, DC sputtering can also be employed. For each of the examples, a titanium substrate was positioned to receive the deposition of the sputtered amorphous alloy. The composition of each alloy was verified by X-ray analysis and was amorphous to X-ray analysis. The distance between the target and the substrate in each instance was approximately 10 cm.

The amorphous metal alloys were then employed as the oxygen anode in a standard two electrode electrochemical test configuration in a 0.5M Na$_2$SO$_4$ and 0.5M Na$_2$CO$_3$ solution (pH 6). In these experiments, 10 mA/cm$^2$ of current was passed at 25° C. Current-potential curves were also measured and the current densities associated with oxygen evolution at a representative potential, +1.7 V (vs. SCE) have been presented in Table I for these amorphous alloy anodes. Current density for polycrystalline platinum has also been presented as a comparative control, Example No. 1, and by comparing the different values, the amorphous alloy anodes are clearly distinguishable therefrom as well as from each other.

TABLE I

| | Current Densities for Amorphous Metal Alloy Oxygen Anodes | |
|---|---|---|
| Ex. No. | Electrode | I(mA) at 1.7V (vs SCE) |
| 1 | Polycrystalline Pt[a] | 7.19 |
| 2 | $Pt_{80}Si_{20}$ | 6.56 |
| 3 | $Pt_{75}Si_{25}$ | 12.50 |
| 4 | $Pt_{65}Si_{35}$ | 2.19 |
| 5 | $Pt_{75}Ge_{25}$ | 10.44 |
| 6 | $Pt_{48}Ag_{32}Si_{20}$ | 8.75 |
| 7 | $Pt_{72}Ir_{8}Si_{20}$ | 11.25 |
| 8 | $Pt_{80}B_{20}$ | 11.25 |
| 9 | $Pt_{80}Sb_{20}$ | 5.47 |
| 10 | $Pt_{70}Ge_{15}Al_{15}$ | 39.20 |

[a]Control

The foregoing examples demonstrate the use of novel platinum based amorphous metal alloy oxygen anodes in at least one electrolytic process. It can be observed that most of the oxygen anodes appearing in Table I had current densities equal to or greater than polycrystalline platinum, some as high as 3.5 to 5.5 times being reported (Examples No. 7 and 10). Where current densities were lower than polycrystalline platinum, the value could be improved by varying the relative atomic percents as is borne out for the Pt/Si alloy anodes presented as Examples No. 2, 3 and 4. Moreover, for Example No. 2, no degradation of the electrode could be measured after several months of operation.

In conclusion, although several amorphous metal oxygen anodes have been exemplified herein, it will readily be appreciated by those skilled in the art that other amorphous metal alloys could be substituted therefor as an oxygen anode for virtually any electrolytic process where an oxygen anode is required.

It is to be understood that the foregoing examples have been provided to enable those skilled in the art to have representative examples by which to evaluate the invention and that these examples should not be construed as any limitation on the scope of this invention. Inasmuch as the composition of the amorphous metal alloy oxygen anodes employed in the present invention can be varied within the scope of the total specification disclosure, neither the particular A or D components nor the relative amounts of the components in the binary and ternary alloys exemplified herein shall be construed as limitations of the invention.

Furthermore, while these alloys were prepared by a sputtering technique which is a useful means for depositing the alloy onto a metal substrate such as titanium, it is to be understood that neither the process of sputtering nor the coating of substrates are to be construed as limitations of the present invention, inasmuch as the oxygen anodes can be prepared by other processes and have other forms.

Thus, it is believed that any of the variables disclosed herein can readily be determined and controlled without departing from the spirit of the invention herein disclosed and described. Moreover, the scope of the invention shall include all modifications and variations that fall within the of the attached claims.

We claim:

1. Improved electrolytic processes where oxygen is generated at the anodes, the improvement comprising the step of:

conducting said electrolysis process in an electrolytic cell having a platinum based amorphous metal alloy oxygen anode having the formula $Pt_p A_a D_d$ where A is one or more elements selected from the group consisting of Cr, Mo, W, Fe, Os, Ir, Cu, Ni, Rh, Pd, Ag, Ti, Ru, Nb, V, Ta and Au;

D is one or more elements selected from the group consisting of B, C, Si, Al, Ge, P, As, Sb and Sn;

p ranges from about 40 to 92;

a ranges from about 0 to 40; and d ranges from about 8 to 60, with the provisos that $p+a+d=100$ and when D is Si or P, and A does not include Ir, Rh, Pd, Ti, Ru, Nb or Ta.

2. Improved electrolytic processes, as set forth in claim 1, wherein said platinum based amorphous metal alloy oxygen anode is at least 50 percent amorphous.

3. Improved electrolytic processes, as set forth in claim 1, wherein said platinum based amorphous metal alloy oxygen anode is at least 80 percent amorphous.

4. Improved electrolytic processes, as set forth in claim 1, wherein said platinum based amorphous metal alloy oxygen anode is about 100 percent amorphous.

5. Improved electrolytic processes, as set forth in claim 1, wherein said oxygen anode comprises Pt and Ge.

6. Improved electrolytic processes, as set forth in claim 1, wherein said oxygen anode comprises $Pt_{75}Ge_{25}$.

7. Improved electrolytic processes, as set forth in claim 1, wherein said oxygen anode comprises Pt, Ge and Si.

8. Improved electrolytic processes, as set forth in claim 7, wherein said oxygen anode comprises $Pt_{65}Ge_{15}Si_{20}$.

9. Improved electrolytic processes, as set forth in claim 1, wherein said oxygen anode comprises Pt, Ag and Si.

10. Improved electrolytic processes, as set forth in claim 9, wherein said oxygen anode comprises $Pt_{72}Ag_8Si_{20}$.

11. Improved electrolytic processes, as set forth in claim 9, wherein said oxygen anode comprises $Pt_{48}Ag_{31.2}Si_{20}$.

12. Improved electrolytic processes, as set forth in claim 1, wherein said oxygen anode comprises Pt, B and Si.

13. Improved electrolytic processes, as set forth in claim 12, wherein said oxygen anode comprises $Pt_{75}B_5Si_{20}$.

14. Improved electrolytic processes, as set forth in claim 1, wherein said oxygen anode comprises Pt and B.

15. Improved electrolytic processes, as set forth in claim 14, wherein said oxygen anode comprises $Pt_{80}B_{20}$.

16. Improved electrolytic processes, as set forth in claim 1, wherein said oxygen anode comprises Pt and Sb.

17. Improved electrolytic processes, as set forth in claim 16, wherein said oxygen anode comprises $Pt_{80}Sb_{20}$.

18. Improved electrolytic processes, as set forth in claim 1, wherein said oxygen anode comprises Pt, Ge and Al.

19. Improved electrolytic processes, as set forth in claim 18, wherein said oxygen anode comprises $Pt_{70}Ge_{15}Al_{15}$.

20. Improved electrolytic processes, as set forth in claim 1, wherein said oxygen anode comprises Pt, Ir and B.

21. Improved electrolytic processes, as set forth in claim 20, wherein said oxygen anode comprises $Pt_{60}Ir_{20}B_{20}$.

22. Improved electrolytic processes, as set forth in claim 1, wherein said platinum based amorphous metal alloy oxygen anode has a thickness of up to about 100 microns.

23. Improved electrolytic processes, as set forth in claim 1, wherein electrolysis is conducted at a voltage range of from about 1.10 to 2.50 volts (SCE) and current densities of from about 10 to 2000 mA/cm$^2$.

24. Improved electrolytic processes, as set forth in claim 1, wherein electrolysis is conducted at a temperature range of from about 0° to about 100° C.

25. Improved electrolytic processes, as set forth in claim 1, wherein A is one or more elements selected from the group consisting of Cr, Mo, W, Fe, Os, Cu, Ni, Ag, V, Au and mixtures thereof.

26. Improved electrolytic processes, as set forth in claim 1, where D is one or more elements selected from the group consisting of B, Al, Ge, As, Sb, Sn and mixtures thereof.

27. Improved electrolytic processes where oxygen is generated at the anodes, the improvement comprising the step of:

conducting said electrolysis process in an electrolytic cell having a platinum based amorphous metal alloy oxygen anode having the formula $Pt_p A_a D_d$ where A is one or more elements selected from the group consisting of Cr, Mo, W, Fe, Os, Ir, Cu, Ni, Rh, Pd, Ag, Ti, Ru, Nb, V, Ta and Au;

D is one or more elements selected from the group consisting of B, C, Si, Al, Ge, P, As, Sb and Sn;

p ranges from about 40 to 92;

a ranges from about more than 5 to 40; and d ranges from about 8 to 60, with the provisos that $p+a+d=100$ and when D is Si or P, A does not include Ir, Rh, Pd, Ti, Ru, Nb or Ta.

* * * * *